United States Patent [19]
Pratt

[11] 4,049,943
[45] Sept. 20, 1977

[54] WELDING APPARATUS

[75] Inventor: Wayne F. Pratt, Plymouth, Mass.

[73] Assignee: K.A.L. Manufacturing Corporation, Plymouth, Mass.

[21] Appl. No.: 619,690

[22] Filed: Oct. 6, 1975

[51] Int. Cl.² .............................................. B23K 9/32
[52] U.S. Cl. ................................ 219/74; 174/15 WF;
174/22 R; 219/130; 219/136
[58] Field of Search ....................... 174/15 WF, 22 R;
219/74, 130, 136, 75; 339/16 R, 16 C

[56] References Cited
U.S. PATENT DOCUMENTS

| 3,061,709 | 10/1962 | Hill | 219/75 |
| 3,108,179 | 10/1963 | Ulli | 219/130 |
| 3,195,095 | 7/1965 | Field | 339/16 R |
| 3,847,287 | 11/1974 | Dinse | 219/130 |

FOREIGN PATENT DOCUMENTS 994,655   6/1965   United Kingdom ................ 219/130

Primary Examiner—J. V. Truhe
Assistant Examiner—N. D. Herkamp.

[57] ABSTRACT

Welding apparatus comprising a power and gas transmission cable having coupling means including normally closed valve means for controlling passage of gas from said cable, a first welding torch including a gas passage and having first torch coupling means adapted for connection to said cable coupling means, said torch coupling means including means for opening said valve means with said first torch and cable coupling means connected, and a second welding torch having second torch coupling means adapted for connection to said cable coupling means, said second torch coupling means adapted to maintain said valve means closed with said second torch and cable coupling means connected.

7 Claims, 4 Drawing Figures

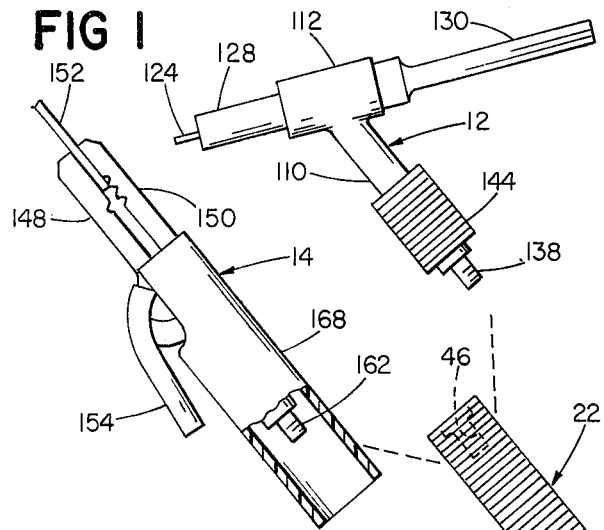
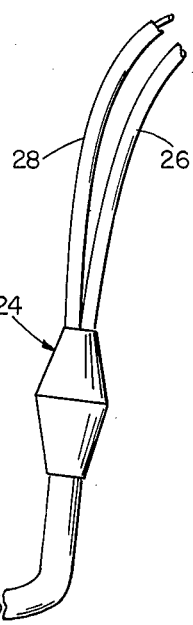
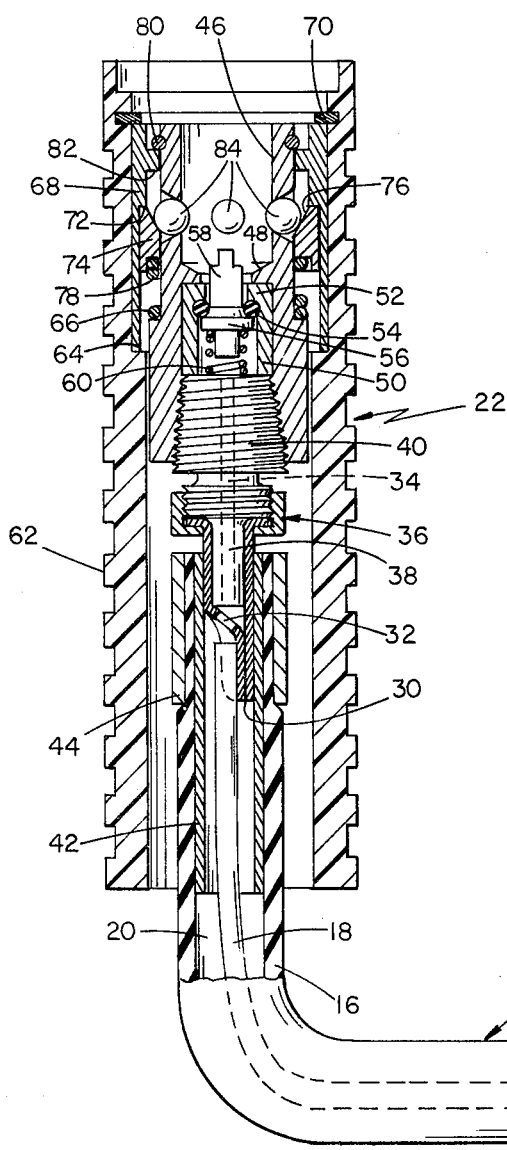
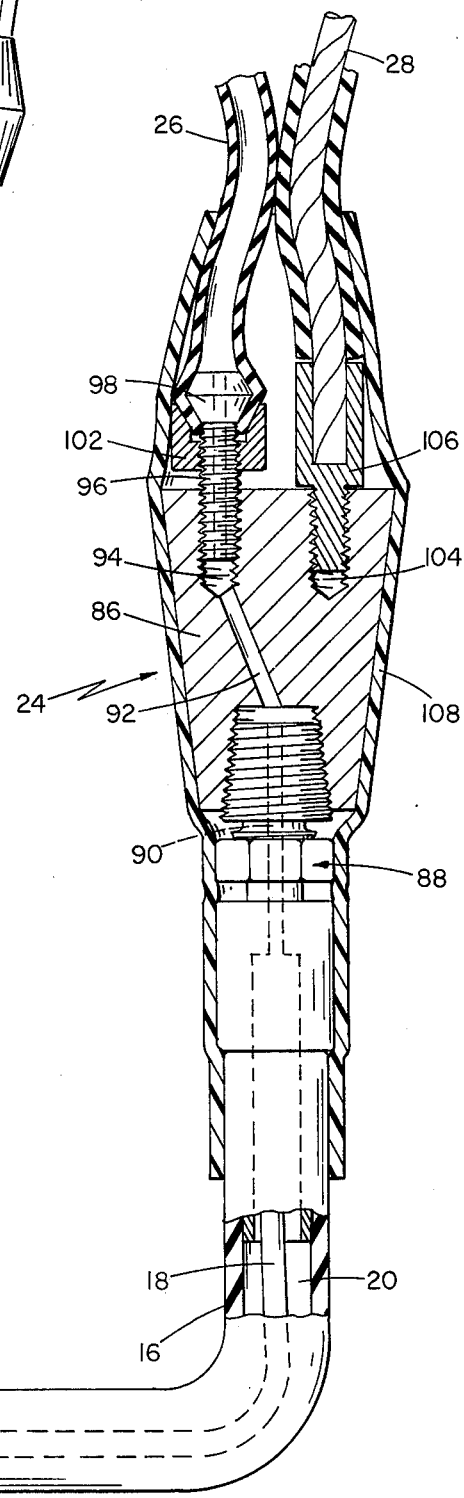
FIG 1
FIG 2

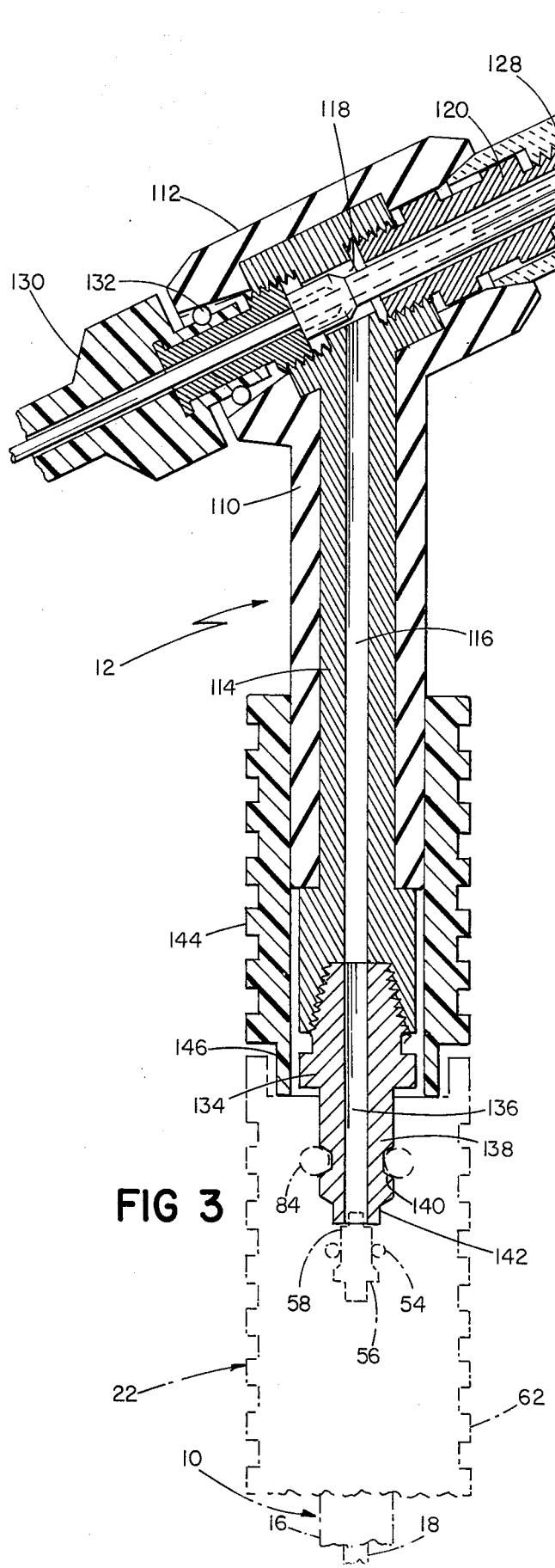
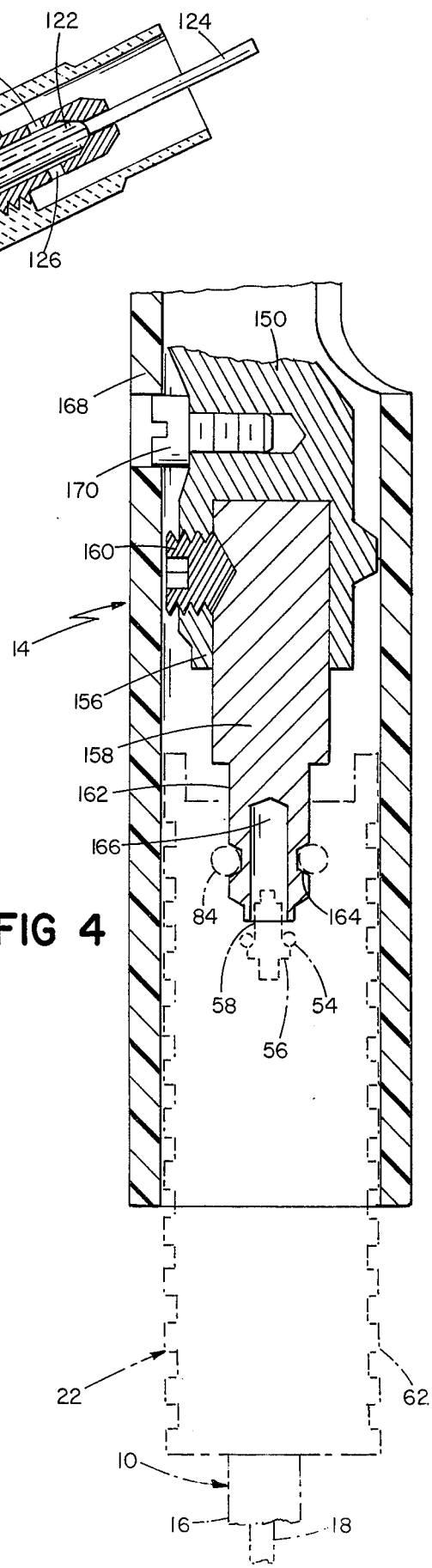

WELDING APPARATUS

This invention relates to welding apparatus and more particularly to interchangeable apparatus for electric arc welding or for inert gas shielded arc welding.

It is a principal object of this invention to provide a welding system for the use of different welding processes, including gas shielded arc welding, which eliminates the need for separate power supply cables and which eliminates the need for welding head conversion. It is a further object of this invention to provide in such a system, means for automatically controlling gas flow from the cable in accordance with the welding process to be employed, eliminating the need for access to a manual shut-off valve at the gas source or elsewhere. In preferred embodiments, another object of this invention is to permit 360° rotation of the welding head relative to the power supply cable.

In general, the invention features, in combination and separately, a cable and a pair of welding heads adapted for connection to the cable. The cable includes a first conductor, a first gas passage and conductive cable coupling means connected to the first conductor having a valve gas passage with normally closed valve means in communication with the first gas passage. A first welding torch is adapted to hold a first electrode and has a gas outlet adjacent the electrode position. The first torch also includes conductive first torch coupling means adapted for connection to the electrode and has a coupling gas passage in communication with the gas outlet. The first torch coupling means is adapted for selective electrically conductive connection to the cable coupling means with the torch coupling gas passage in communication with the valved gas passage and includes means for opening the valve means with the first torch coupling means and the cable coupling means connected. A second welding torch is adapted to hold a second electrode. The second torch includes conductive second torch coupling means adapted for selective electrical connection to the cable coupling means, the second torch coupling means adapted to maintain the valve means closed when connected to the cable coupling means.

In preferred embodiments, the various coupling means are cylindrical with coaxial gas passages therein adapted for rotation of a torch relative to the cable. The cable coupling is a female fitting and the torch couplings are male fittings. Latching means are provided on the cable connector for securing a torch thereto, the torch couplings having annular grooves for receiving the latching means, the latching means normally biased toward the grooves, and retraction means being provided for moving the latching means away from the grooves.

Other objects, features and advantages of this invention will be apparent to those skilled in the art from the following detailed description of a preferred embodiment thereof taken together with the accompanying drawings in which:

FIG. 1 is an isometric exploded view of welding apparatus according to the invention;

FIG. 2 is an enlarged partly sectional elevation of a welding cable according to the invention;

FIG. 3 is a sectional elevation of a welding torch according to the invention, showing in phantom view its connection to the cable; and FIG. 4 is a fragmentary sectional elevation of another welding torch according to the invention, showing in phantom view its connection to the cable.

As illustrated in FIG. 1, the welding apparatus comprises a welding cable 10 and welding torches 12, 14 for gas shielded arc welding and for electric arc welding, respectively.

The cable 10, shown in greater detail in FIG. 2, comprises an outer insulating cover 16 having therewithin a first electrical conductor 18. Cover 16 is enlarged relative to conductor 18 to also define a first gas passage 20 within the cable. The cable 10 at one end includes conductive cylindrical cable coupling means 22 for coupling welding torches 12, 14 thereto. At the other end a transition section 24 is provided for connection of a gas hose 26 and a separate insulated conductor 28 to the cable 10.

The cable coupling means 22 includes a tube 30 crimped at one end and having conductor 18 connected thereto as by soldering. Tube 30 is perforated at 32 to permit passage of gas past the crimp to a gas passage 34 defined in part by the inner portion of tube 30. At its other end, tube 30 is connected to a flare fitting 36 having at one end a tubular extension 38 within tube 30, for strengthening the connection between the tube 30 and the fitting 36, and having an outside threaded adapter portion 40 at the other end. A rigid tube 42 is positioned tightly on the outside of tube 30 extending therebeyond in the direction of cable 10 and cover 16 is positioned on the outside of the tube 42, tube 42 serving to prevent constriction of gas passage 20 adjacent the coupling means 22. Collar 44 clamps cover 16 to tube 42 rendering the cover air tight. Tube 30 and flare fitting 36 are of conductive material and gas passage 34 extends axially through flare fitting 36 and communicates with the first gas passage 20 through perforation 32 in tube 30.

Valve means and latching means are provided in a female fitting on the adapter portion 40 of flare fitting 36. A cylindrical tubular sleeve 46 is threaded on adapted portion 40 at one end and comprises the female fitting which is open at its other end. Within sleeve 46 an integral ring 48 and adapter 40 is positioned the valve means comprising a tubular insert 50 having an annular flange 52 adjacent ring 48 retaining an elastomeric O-ring 54 therein as a valve seat. The valve means also comprises a valve member 56 having a stem 58 extending through insert 50 beyond ring 48 and a spring 60 engaging valve member 56 adapter 40, biasing valve member 56 to a position normally closing gas passage 34. Passage 34 and valve member 56 are coaxial of cylindrical sleeve 46.

A rigid tubular outer insulating cover 62 extends beyond the open female end of sleeve 46 in one direction and in the other direction extends to the end of tube 42. Cover 62 engages sleeve 46 in a slip fit adjacent adapter 40 but cover 62 and sleeve 46 are recessed from each other therefrom to the open end of sleeve 46 to provide shoulders 64, 66 facing the open end. An tubular insert 68 is provided in the recess of cover 62 bearing against shoulder 64 thereof and retained therein by washer 70. Insert 68 is recessed to provide a shoulder 72 facing shoulder 64. A cam member 74 is positioned against shoulder 72 having an inclined cam surface 76 facing the open end of sleeve 46. A spring 78 engages cam member 74 and shoulder 66 of sleeve 46 biasing the cam member 74, insert 68 and cover 62 toward the open end. A ring 80 in a groove about the outer periphery of sleeve 46 engages an inward projection 82 of insert 68 to secure the assembly. A plurality of balls 84 are positioned in holes extending through sleeve 46. The holes are sized to permit balls 84 to protrude partly into the interior of sleeve 46 for latching purposes. The balls 84 are biased to a latching position by cam 74 and spring 78. Retraction of cover 62 releases the balls 84 to permit radial retraction thereof outwardly. The balls 84 have a sufficiently large diameter however that they engage projection 82 to limit retraction.

The transition section 24 of cable 10 includes a block 86 of conductive material connected to cable cover 16 and conductor 18 by a flare fitting 88 in the same manner as adjacent the cable coupling means 22. Fitting 88 threaded into block 86 includes a passage 90 therethrough communicating with an angled passage 92 extending to a threaded hole 94. A tubular threaded nipple 96 having an enlarged head 98 extends into hole 94. Gas hose 26 is fitted over the head 98 of nipple 96 and is secured by a cap 102 threaded on member 96. A separate adjacent threaded hole 104 has a member 106 therein having a tubular section containing and fastening conductor 28. Hose 26 and conductor 28 are, respectively, thereby adapted for connection to separate sources (not shown) of gas and power for transmission through cable 10. An insulating covering 108 of polyethylene or polyvinyl is heat-shrunk to extend over the transition section 24.

Welding torches 12, 14 are best shown in FIGS. 3 and 4, respectively. Torch 12 adapted for gas shielded arc welding comprises a body 110 and a head 112 of substantially conventional design. The body 110 of insulating material has a tubular second conductor 114 therein extending to the head 112 and defining a torch gas passage 116 therethrough. Head 112 is integral with body 110. Conductor 114 terminates in head 112 and has a passage 118 therethrough, threaded at each end, communicating with gas passage 116. A tubular conductive collet body 120 is threaded into one end of passage 118 adapted to receive therein conductive collet 122 for securing electrode 124 in the head 112. The collet 122 has an outer diameter smaller than the inner diameter of collet body 120 to permit the flow of gas therealong from passage 118 and collet body 120 has gas outlets 126 adjacent its end. A ceramic shielding cap 128 is threaded on the outside of collet body 120 extending from head 112 to adjacent the end of electrode 124. A back cap 130 is threaded into the other end of passage 118 bearing against collet 122 with electrode 124 extending thereinto. An O-ring 132 mounted on back cap 130 seals against head 112.

Cylindrical conductive first torch coupling means 134 is threaded into the end of conductor 114 opposite head 112 and has a first torch coupling passage 136 extending coaxially therethrough. Torch coupling means 134 comprises a male fitting having an extension 138 adapted to fit within the female sleeve 46 of cable coupling means 22. An annular groove 140 about the periphery of extension 138 is adapted for locking engagement with balls 84 in the cable coupling as illustrated in broken lines in FIG. 3. Passage 136 has a diameter smaller than valve stem 58 and the end 142 of extension 138 extends sufficiently far to seat on the bottom of sleeve 46 and to depress valve stem 58 relative to seal 54 when the torch 12 is connected to cable 10, gas thereby being permitted to flow past the valve (valve stem 58 being narrower in one dimension [not shown] than seal 54) to the torch. A tubular cover 144 of insulating material is mounted on the torch body 110 and has a flange 146 adapted to fit within the cover 62 when the torch 12 and cable 10 are connected.

A second torch 14 for electric arc welding comprises insulated conductive clamping jaws 148, 150, shown in FIG. 1, for holding an electrode 152. One jaw 148 has an insulated handle 154 and is pivotally mounted (not as shown) to fixed jaw 150. Spring means (not as shown) biases the jaw together. Fixed jaw 150 comprises a third conductor and, as shown in FIG. 4, has an enlarged end 156 with bore therein receiving conductive second torch coupling means 158 fixed in position by fastener 160. Second coupling means 158, as with first torch coupling means 134, comprises a cylindrical male fitting having an extension 162 adapted to fit in the female sleeve 46 of cable coupling means 22 and having an annular groove 164 for locking engagement with balls 84 in the cable coupling, illustrated in broken lines in FIG. 4. Extension 162, on the other hand, has a blind passage 166 therein of a diameter larger than valve stem 58 thereby to maintain valve member 56 seated against seal 54 with extension 162 seated against the bottom of sleeve 46 when the second torch 14 is connected to the cable. Insulating cover 168 connected to second torch 14 by fastener 170 extends beyond the second coupling means 158 and has a diameter larger than cover 62 to receive cover 62 therein.

To connect the torches 12, 14 to cable 10, cover 62 of the cable coupling means is retracted to move cam 74 away from balls 84. The torch coupling means of the derived torch is then inserted into sleeve 46 of the cable coupling means. Cover 62 is then released and spring 78 moves cam 74 toward balls 84 forcing them into the groove 140 or 164 of the torch coupling means. If torch 12 is employed, the end of coupling means 134 depresses valve member 56 to permit gas flow. If, on the other hand, torch 14 is employed, blind passage 166 fits over valve stem 58 maintaining valve stem 58 in its normally closed position. Once connected to cable 10, torches 12, 14 are used conventionally. Advantageously, however, because of the cylindrical design of the couplings and the ball in groove connection thereof, the torches are rotatable 360° relative to cable 10. To disconnect the torches, the cover 62 of the cable coupling means is retracted again releasing the balls and the torches may simply be slipped away from the cable coupling means. When torch 12 is removed, valve member 56 is automatically closed by spring 60.

Other embodiments of this invention will occur to those skilled in the art which are within the scope of the following claims.

What is claimed is:

1. Welding apparatus comprising, in combination:
   a cable having a first electrical conductor and a first gas passage, said cable at one end having conductive cable coupling means, said cable coupling means connected to said first conductor and having a valved gas passage, including normally closed valve means, in communication with said first gas passage;
   a first welding torch adapted to hold a first electrode and having a gas outlet adjacent the position of said first electrode in said torch, said first torch having a second electrical conductor therewithin adapted for connection to said first electrode and a torch gas passage therewithin in communication with said gas outlet, and said first torch having conductive first torch coupling means, said first torch coupling means connected to said second conductor and having a torch coupling gas passage in communication with said second gas passage, said first torch coupling means adapted for selective electrically conductive connection to said cable coupling means with said torch coupling gas passage in communication with said valved gas passage, said first torch coupling means including means for opening said valve means with said first torch coupling means and said cable coupling means connected; and a second welding torch adapted to hold a second electrode, said torch having a third electrical conductor therewithin adapted for connection to said second electrode, and said second torch having conductive second torch coupling means connected to said third conductor, said second torch coupling means adapted for selective electrically conductive connection to said cable coupling means, said second torch coupling means adapted to maintain said valve means in said normally closed position with said second torch coupling means and said cable coupling means connected.

2. The apparatus claimed in claim 1 in which said means in said first welding torch for opening said valve means comprises an extension of said first torch coupling means adapted to engage and depress said valve means and in which said second torch coupling means is adapted to overlie but not to depress said valve means.

3. The apparatus claimed in claim 1 in which said cable coupling means and said torch coupling means are cylindrical with said gas passages axially positioned therein and said torch coupling means are adapted for rotation relative to said cable coupling means when connected thereto.

4. The apparatus claimed in claim 3 in which said cable coupling means comprises a female fitting, said torch coupling means comprise male fittings, and one of said cable coupling means and said torch coupling means includes latching means for latching said one to the other of said cable coupling means and said torch coupling means.

5. The apparatus claimed in claim 4 in which said other of said cable coupling means and said torch coupling means includes annular groove means for receiving said latching means, said latching means include a plurality of circumferentially positioned latching members, means normally biasing said latching members in the direction of said groove, and means for selectively permitting said latching members to move radially in a direction away from said groove means.

6. The apparatus claimed in claim 5 in which said cable coupling means includes said latching means and said torch coupling means each include said groove means.

7. The apparatus claimed in claim 6 in which said means in said first welding torch for opening said valve means comprises an extension of said first torch coupling means adapted to engage and depress said valve means and in which said second torch coupling means is adapted to overlie but not to depress said valve means.

* * * * *

UNITED STATES PATENT AND TRADEMARK OFFICE
CERTIFICATE OF CORRECTION

PATENT NO. : 4,049,943

DATED : September 20, 1977

INVENTOR(S) : Wayne F. Pratt

It is certified that error appears in the above-identified patent and that said Letters Patent are hereby corrected as shown below:

Col. 4, line 8, "not as shown" should be --not shown--.

Col. 5, line 13, after "said", insert --second--.

Signed and Sealed this

Ninth Day of May 1978

[SEAL]

Attest:

RUTH C. MASON
Attesting Officer

LUTRELLE F. PARKER
Acting Commissioner of Patents and Trademarks